US012589540B2

(12) United States Patent
Sugihara et al.

(10) Patent No.: US 12,589,540 B2
(45) Date of Patent: Mar. 31, 2026

(54) MANUFACTURING METHOD FOR MOLDED ARTICLE

(71) Applicant: TOYOTA JIDOSHA KABUSHIKI KAISHA, Toyota (JP)

(72) Inventors: Atsushi Sugihara, Toyota (JP); Shun Kishimoto, Toyota (JP); Taichi Ito, Toyota (JP); Shinya Asai, Kariya (JP); Tatsuya Yamashita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 18/631,248

(22) Filed: Apr. 10, 2024

(65) Prior Publication Data

US 2024/0416568 A1    Dec. 19, 2024

(30) Foreign Application Priority Data

Jun. 16, 2023    (JP) ................................ 2023-099049

(51) Int. Cl.
| | |
|---|---|
| *B29C 45/14* | (2006.01) |
| *B29C 45/00* | (2006.01) |
| *B29C 45/16* | (2006.01) |
| *B29C 45/77* | (2006.01) |
| *B29K 23/00* | (2006.01) |
| *B29L 31/26* | (2006.01) |
| *B29L 31/34* | (2006.01) |

(52) U.S. Cl.
CPC .......... *B29C 45/77* (2013.01); *B29C 45/0001* (2013.01); *B29C 45/14* (2013.01); *B29C 45/1671* (2013.01); *B29K 2023/00* (2013.01); *B29L 2031/26* (2013.01); *B29L 2031/3468* (2013.01)

(58) Field of Classification Search
CPC .............. B29C 45/77; B29C 45/14336; B29C 45/1671
See application file for complete search history.

(56) References Cited

U.S. PATENT DOCUMENTS

2002/0024158 A1* 2/2002 Nishigaki .............. B29D 11/00
264/2.5

FOREIGN PATENT DOCUMENTS

| | | | |
|---|---|---|---|
| JP | 2004-301951 A | | 10/2004 |
| JP | 2006-110905 A | | 4/2006 |
| JP | 2018120818 | * | 8/2018 |
| JP | 6787254 | * | 11/2020 |

(Continued)

*Primary Examiner* — Edmund H Lee
(74) *Attorney, Agent, or Firm* — Oliff PLC

(57) ABSTRACT

A manufacturing method for a molded article is provided, including: a preparing step of preparing an insert member having, on a surface, a first resin part containing a first thermoplastic resin; a filling step of inserting and fixing the first resin part of the insert member into a mold and filling a space between the first resin part and the mold with a molten second thermoplastic resin using an injection molding apparatus; and a pressure holding step of applying a holding pressure to the second thermoplastic resin that the space is filled with, wherein in the pressure holding step, a first holding pressure is applied until an inner temperature of the first resin part reaches a deflection temperature under load of the first thermoplastic resin, and a second holding pressure lower than the first holding pressure is applied after the inner temperature reaches the deflection temperature under load.

4 Claims, 5 Drawing Sheets

(56)     References Cited

FOREIGN PATENT DOCUMENTS

| | | | |
|---|---|---|---|
| TW | 1735631 | * | 8/2021 |
| WO | WO9935708 | * | 7/1999 |
| WO | WO2009072291 | * | 4/2011 |
| WO | WO2014013871 | * | 1/2014 |

* cited by examiner

MANUFACTURING METHOD FOR MOLDED ARTICLE

CROSS-REFERENCE TO RELATED APPLICATION

This application claims priority to Japanese Patent Application No. 2023-099049 filed on Jun. 16, 2023, incorporated herein by reference in its entirety.

BACKGROUND

1. Technical Field

The present disclosure relates to a manufacturing method for a molded article.

2. Description of Related Art

In injection molding, typically, a filling step of filling a space (cavity) in a mold with a molten resin and a pressure holding step of applying a holding pressure to the resin that the space is filled with are performed. For example, Japanese Unexamined Patent Application Publication No. 2006-110905 discloses an injection molding method including: examining that, after mold closing, a temperature of the mold cavity is not less than a predetermined temperature to start injection motion; detecting and examining that the injection screw reaches a set position of filling completion and the mold cavity comes to have a predetermined temperature to complete the injection filling step; after that, switching to the pressure holding step; and completing the pressure holding step at a set pressure holding time and/or a set mold cavity temperature.

SUMMARY

When injection molding is performed on an insert member having, on its surface, a resin part containing a thermoplastic resin, heat of the injected resin is conducted to the resin part, occasionally causing the resin part to soften. When a high holding pressure is applied to the softening resin part in the pressure holding step, the softening resin part occasionally deforms, which results in the insert member deforming.

The present disclosure is devised in view of the aforementioned circumstances, and a main object thereof is to provide a manufacturing method for a molded article capable of restraining an insert member from deforming.

[1] A manufacturing method for a molded article, including:

a preparing step of preparing an insert member having, on a surface, a first resin part containing a first thermoplastic resin;

a filling step of inserting and fixing the first resin part of the insert member into a mold and filling a space between the first resin part and the mold with a molten second thermoplastic resin using an injection molding apparatus; and a pressure holding step of applying a holding pressure to the second thermoplastic resin that the space is filled with, wherein in the pressure holding step, a first holding pressure is applied until an inner temperature of the first resin part reaches a deflection temperature under load of the first thermoplastic resin, and a second holding pressure lower than the first holding pressure is applied after the inner temperature reaches the deflection temperature under load.

[2] A manufacturing method for a molded article, including:

a preparing step of preparing an insert member having, on a surface, a first resin part containing a first thermoplastic resin;

a filling step of inserting and fixing the first resin part of the insert member into a mold and filling a space between the first resin part and the mold with a molten second thermoplastic resin using an injection molding apparatus; and a pressure holding step of applying a holding pressure to the second thermoplastic resin that the space is filled with, wherein in the pressure holding step, a first holding pressure is applied until an advancing amount (dL/dt) of a screw of the injection molding apparatus per unit time reaches a changing point, and a second holding pressure lower than the first holding pressure is applied after the dL/dt reaches the changing point.

[3] The manufacturing method for a molded article according to [1] or [2], wherein:

each of the first thermoplastic resin and the second thermoplastic resin is polyolefin;

the first holding pressure is not less than 1.5 MPa; and the second holding pressure is less than 1.5 MPa.

[4] The manufacturing method for a molded article according to any one of [1] to [3], wherein:

the molded article is a member used for a power storage module;

the insert member has an electrode body having a plurality of electrodes stacked in a thickness direction, and a resin-made seal part arranged along an outer edge of the electrode body;

each electrode has a current collector body, and an active material layer; and the seal part is the first resin part.

[5] The manufacturing method for a molded article according to [4], wherein the electrode body has a bipolar electrode as the electrode.

The manufacturing method for a molded article in the present disclosure affords an effect capable of restraining the insert member from deforming.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereafter, manufacturing methods for a molded article in the present disclosure will be described in detail using the drawings. The drawings presented below are schematic, and the sizes and the shapes of individual parts therein are properly exaggerated for easy understanding. Moreover, in the present specification, when a mode of arranging a member relative to another member is expressed, simply stating "being on" or "being beneath" includes both a case of arranging the member right on or right beneath to be in contact with the other member and a case of arranging the member above or below the other member via still another member, unless otherwise noted.

Manufacturing methods for a molded article in the present disclosure are roughly categorized into two embodiments by a method of pressure control in the pressure holding step. Hereafter, such manufacturing methods for a molded article in the present disclosure will be dividedly described as a first embodiment and a second embodiment.

1. First Embodiment

Figure 1A:
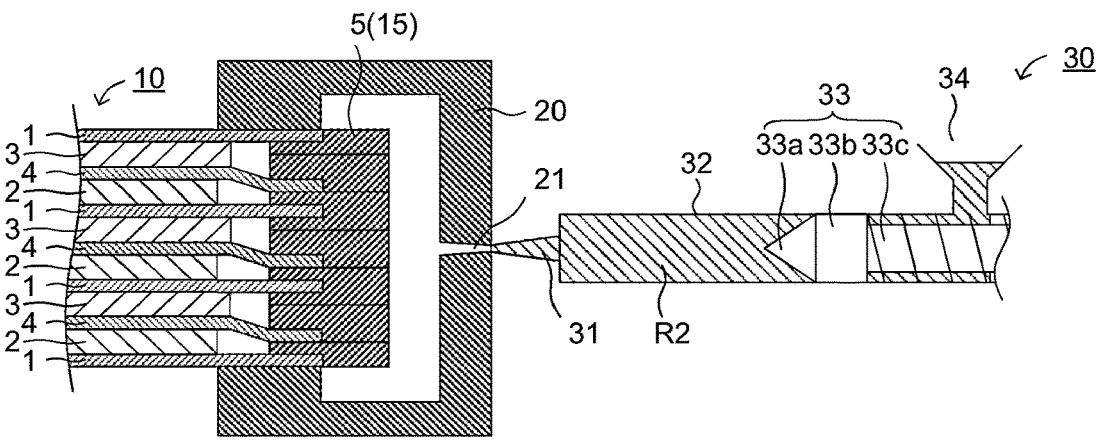
FIG. 1A is a schematic sectional view exemplarily showing a preparing step, a filling step, and a pressure holding step in the present disclosure.
Figure 1B:
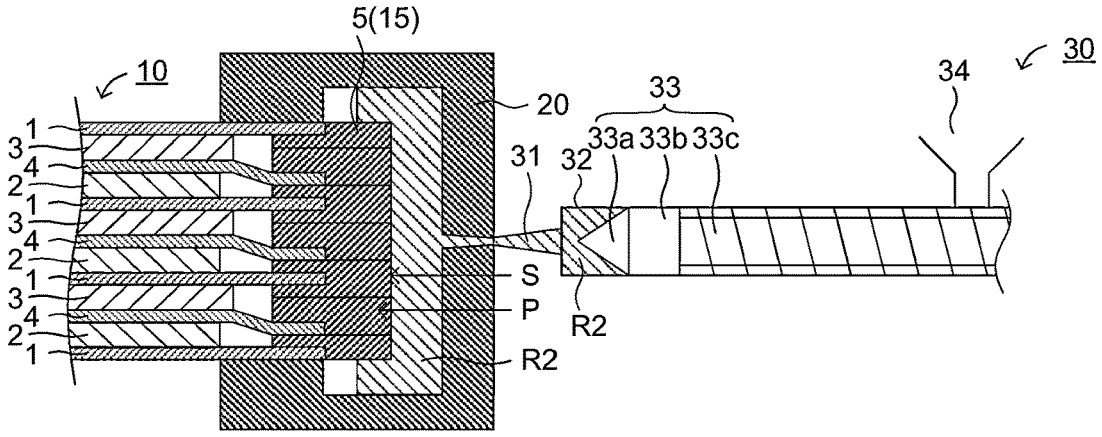
FIG. 1B is a schematic sectional view exemplarily showing the preparing step, the filling step, and the pressure holding step in the present disclosure.
Figure 1C:
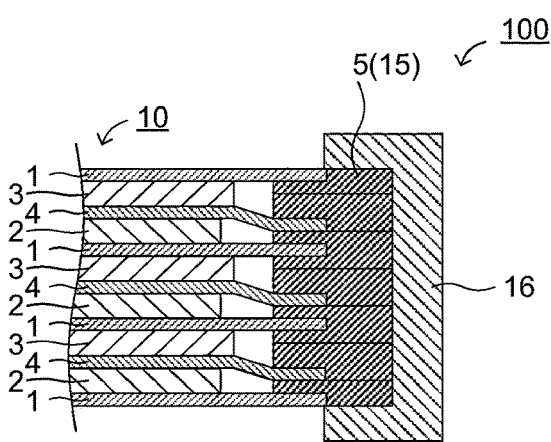
FIG. 1C is a schematic sectional view exemplarily showing the preparing step, the filling step, and the pressure holding step in the present disclosure.

FIG. 1A, FIG. 1B, and FIG. 1C are schematic sectional views exemplarily showing a preparing step, a filling step, and a pressure holding step in the present disclosure. First, as shown in FIG. 1A, an insert member 10 having, on its surface, a first resin part 15 containing a first thermoplastic resin is prepared (preparing step). Next, the first resin part 15 of the insert member 10 is inserted and fixed into a mold 20. Next, a nozzle 31 of an injection molding apparatus 30 is arranged at a sprue 21 of the mold 20. After that, as shown in FIG. 1B, by moving a screw 33 of the injection molding apparatus 30 to the nozzle 31 side, with a second thermoplastic resin R2 that a cylinder 32 is filled with, a space between the first resin part 15 and the mold 20 is filled (filling step). Next, a holding pressure is applied to the second thermoplastic resin R2 that the space is filled with (pressure holding step).

Figure 2:
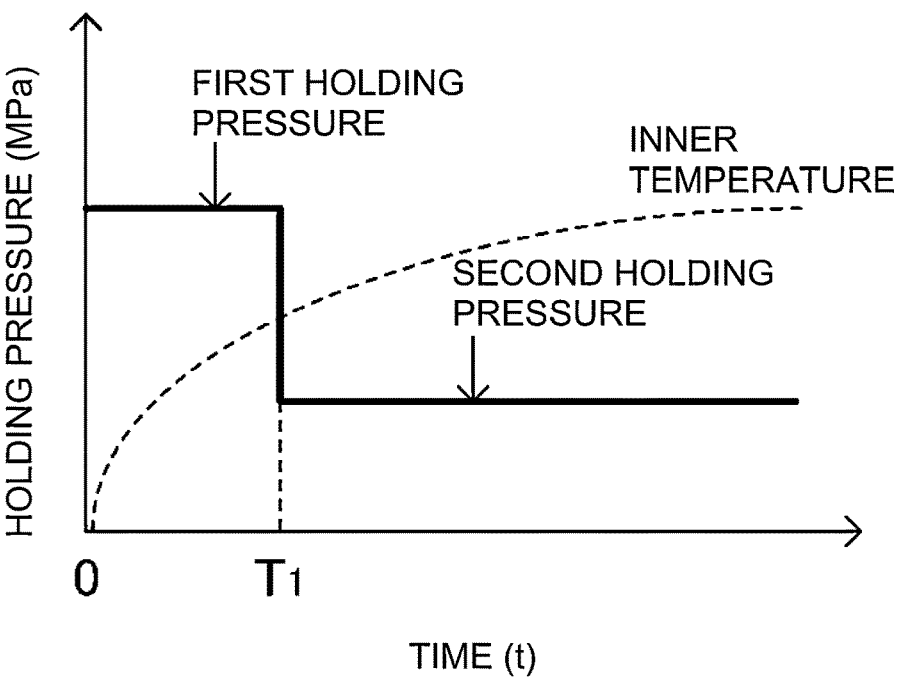
FIG. 2 is a graph for explaining pressure control in the pressure holding step in the present disclosure.

In the first embodiment, as shown in FIG. 1B, a time (hereinafter referred to as time $T_1$) until an inner temperature of the first resin part 15 (for example, a temperature at a position P inner from a surface S of the first resin part 15 by 1 mm) reaches a deflection temperature under load of the first thermoplastic resin constituting the first resin part 15 is beforehand estimated, for example, by computer aided engineering (CAE). As shown in FIG. 2, in the pressure holding step, until the inner temperature of the first resin part 15 reaches the deflection temperature under load of the first thermoplastic resin (until time $T_1$ elapses from the start of pressure holding), a first holding pressure is applied, and after the inner temperature reaches the deflection temperature under load (after time $T_1$ elapses from the start of pressure holding), a second holding pressure lower than the first holding pressure is applied. After that, as shown in FIG. 1B and FIG. 1C, a molded article 100 is taken out from the mold 20. As shown in FIG. 1C, the molded article 100 at least has the first resin part 15 and a second resin part 16 covering a surface of the first resin part 15.

According to the first embodiment, the first holding pressure is applied until the inner temperature of the first resin part reaches the deflection temperature under load of the first thermoplastic resin, after that, the second holding pressure lower than the first holding pressure is applied, and thereby, the molded article in which the insert member is restrained from deforming can be obtained.

Figure 3:
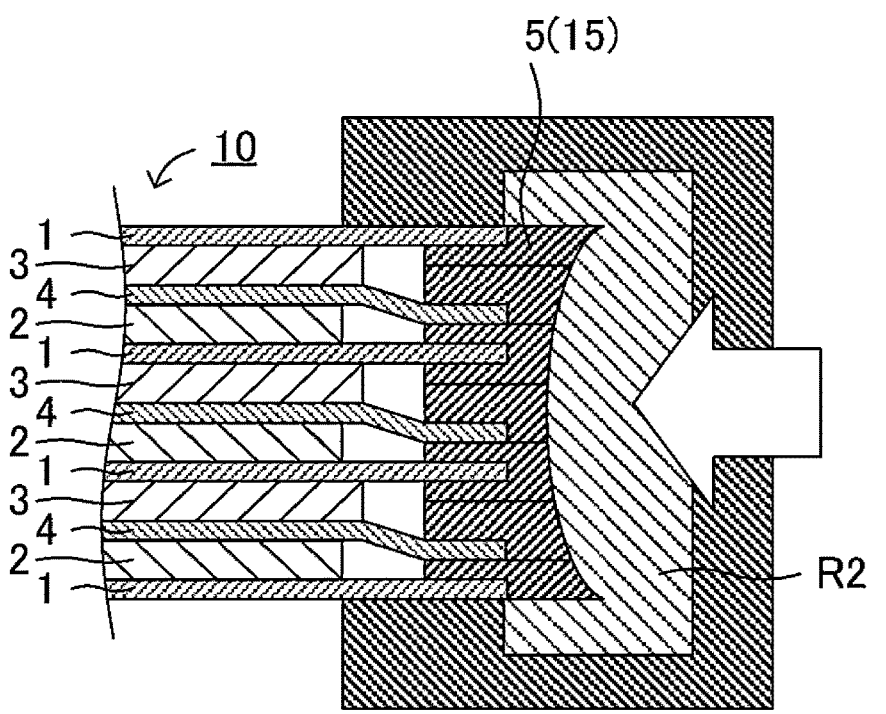
FIG. 3 is a schematic sectional view for explaining a problem in the present disclosure.

Here, as mentioned above, when injection molding is performed on the insert member having the resin part containing the thermoplastic resin on the surface, heat of the injected resin is conducted to the resin part, occasionally causing the resin part to soften. When in the pressure holding step, a high holding pressure is applied to the softening resin part, the softening resin part occasionally deforms, which deforming causes the insert member to deform. Specifically, as shown in FIG. 3, heat of the injected second thermoplastic resin R2 is conducted to the first resin part 15, occasionally causing the first 25 resin part 15 to soften. When in the pressure holding step, a high holding pressure is applied to the softening first resin part 15, the softening first resin part 15 occasionally deforms, which deforming causes the insert member 10 to deform.

In contrast, in the first embodiment, as shown in FIG. 2, in the pressure holding step, the first holding pressure is applied until the inner temperature of the first resin part 15 reaches the deflection temperature under load of the first thermoplastic resin (until time $T_1$ elapses from the start of pressure holding), and the second holding pressure lower than the first holding pressure is applied after the inner temperature reaches the deflection temperature under load (after time $T_1$ elapses from the start of pressure holding). Thereby, the softening first resin part 15 is restrained from deforming due to the holding pressure. As a result, the insert member 10 can be restrained from deforming.

(1) Preparing Step

The preparing step in the first embodiment is a step of preparing the insert member having, on its surface, the first resin part containing the first thermoplastic resin.

The insert member in the first embodiment at least has the first resin part containing the first thermoplastic resin. Moreover, the first resin part is typically arranged so as to constitute a surface of the insert member. Particularly, the first resin part may be arranged so as to constitute a lateral surface of the insert member (surface that extends in the thickness direction of the insert member).

Examples of the first thermoplastic resin include polyolefins such as polyethylene (PE) and polypropylene (PP). Examples of polyethylene include high density polyethylene (HDPE). For example, the density of high density polyethylene is not less than 0.94 g/cm³ and not more than 0.973 g/cm³. Meanwhile, other examples of the first thermoplastic resin include polyvinyl chloride (PVC), polystyrene (PS), acrylonitrile-butadiene-styrene (ABS), acrylonitrile-styrene (AS), polymethyl methacrylate (PMMA), polybutylene terephthalate (PBT), and polyethylene terephthalate (PET).

The deflection temperature under load of the first thermoplastic resin is not specially limited but, for example, not less than 60° C. and not more than 100° C., and may be not less than 70° C. and not more than 90° C. The deflection temperature under load is obtained in conformity to JISK7191. Moreover, the melting point of the first thermoplastic resin is, for example, not less than 100° C. and not more than 140° C., and may be not less than 110° C. and not more than 130° C.

The insert member may have a base part and the first resin part arranged on the base part. Examples of the base part include an electrode body having electrodes, a metal body made of metal, and a resin body made of resin. Moreover, the shape (shape in plan view) of the insert member as viewed from the thickness direction is not specially limited but examples thereof include quadrangles such as a square and a rectangle and circles such as a perfect circle and an ellipse. The lengths of the sides constituting the shape in plan view of the insert member are not specially limited but, for example, each of them is not less than 30 cm, may be not less than 50 cm, and may be not less than 100 cm. Meanwhile, the length of each side is not more than 200 cm, for example. Moreover, the thickness of the insert member is not less than 5 cm and not more than 30 cm, for example. Since as the size of the insert member is larger, the area of the first resin part in contact with the second thermoplastic resin mentioned later is larger, the first resin part more readily deforms. In contrast, in the first embodiment, by controlling the holding pressure in the pressure holding step, the first resin part can be restrained from deforming.

Figure 4A:
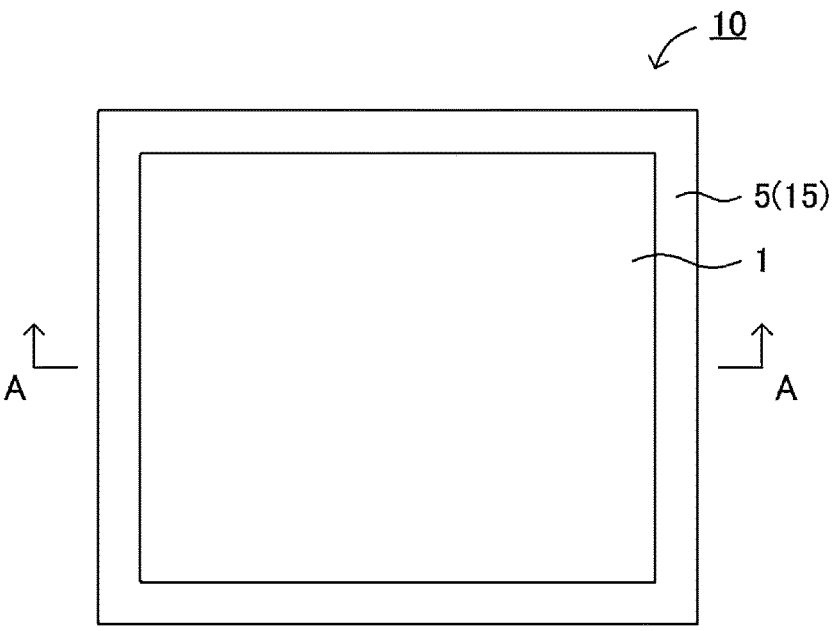
FIG. 4A is a schematic plan view exemplarily showing an insert member in the present disclosure.
Figure 4B:
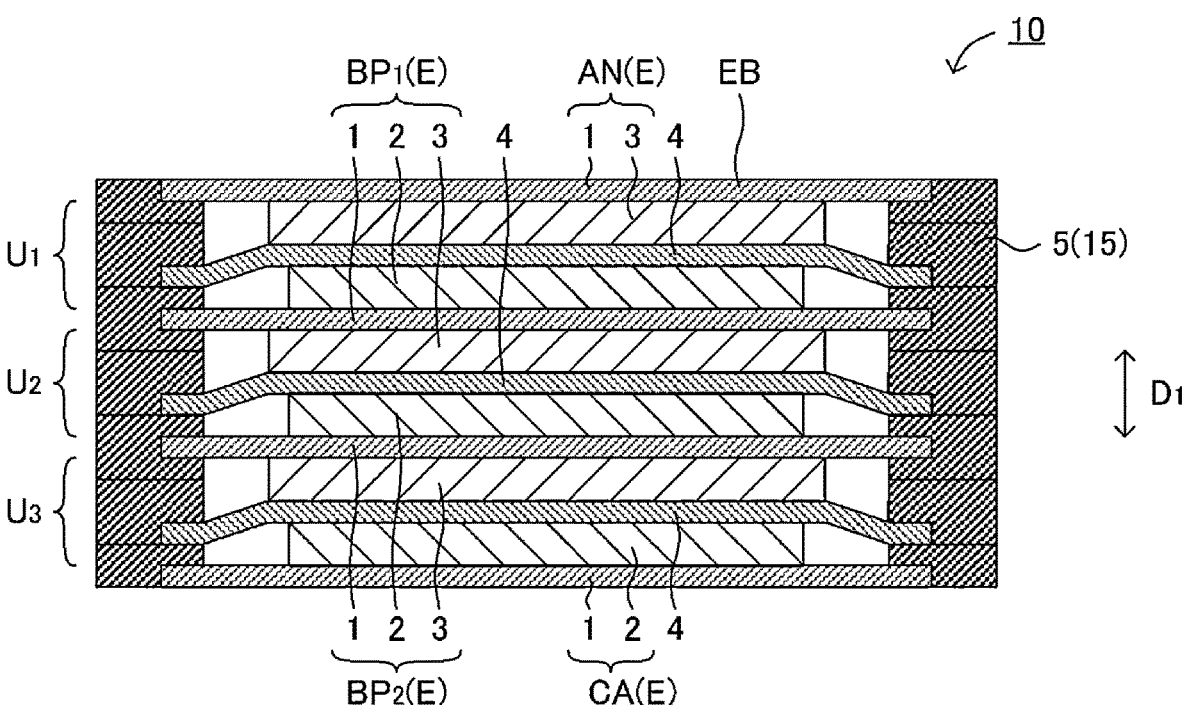
FIG. 4B is a schematic sectional view exemplarily showing the insert member in the present disclosure.

An example of the insert member is described using FIG. 4A and FIG. 4B. FIG. 4A is a schematic plan view exemplarily showing the insert member, and FIG. 4B is a sectional view taken along the A-A line in FIG. 4A. Moreover, the insert member 10 shown in FIG. 4A and FIG. 4B is an electrode body and is typically a member used for a power storage module.

The insert member 10 shown in FIG. 4A and FIG. 4B has an electrode body EB having a plurality of electrodes E stacked in a thickness direction $D_1$, and a resin-made seal part 5 arranged along the outer edge of the electrode body EB. As shown in FIG. 4A, as the insert member 10 is viewed from the thickness direction, the seal part 5 is typically arranged along the whole periphery of the outer edges of the electrodes E. Moreover, the seal part 5 corresponds to the first resin part 15 mentioned above. Moreover, the electrode body EB shown in FIG. 4B has, as the electrodes E, bipolar electrodes BP, a positive electrode-side end part electrode CA, and a negative electrode-side end part electrode AN.

The electrodes E of the insert member 10 have current collector bodies 1 and active material layers (each being at least one of a positive electrode active material layer 2 and a negative electrode active material layer 3). Moreover, as shown in FIG. 4B, the bipolar electrode BP has a current collector body 1, a positive electrode active material layer 2 arranged on one principal surface of the current collector body 1, and a negative electrode active material layer 3 arranged on the other principal surface of the current collector body 1. Moreover, the positive electrode-side end part electrode CA has a current collector body 1 and a positive electrode active material layer 2 arranged on one principal surface of the current collector body 1. Moreover, the negative electrode-side end part electrode AN has a current collector body 1 and a negative electrode active material layer 3 arranged on one principal surface of the current collector body 1.

As shown in FIG. 4B, the insert member 10 may have a plurality of power generation units U ($U_1$, $U_2$, $U_3$) stacked in the thickness direction $D_1$. Such a power generation unit is typically a unit having a positive electrode active material layer, a separator, and a negative electrode active material layer. As mentioned later, the power generation unit functions as a battery by an electrolyte solution being supplied thereto. As shown in FIG. 4B, the plurality of power generation units U ($U_1$, $U_2$, $U_3$) may be connected to one another in series. Otherwise, the plurality of power generation units may be connected to one another in parallel, not specially shown.

In FIG. 4B, the power generation unit $U_1$ has the positive electrode active material layer 2 of the bipolar electrode $BP_1$, the negative electrode active material layer 3 of the negative electrode-side end part electrode AN, and a separator 4 arranged between these positive electrode active material layer 2 and negative electrode active material layer 3. Moreover, the power generation unit $U_2$ has the positive electrode active material layer 2 of the bipolar electrode $BP_2$, the negative electrode active material layer 3 of the bipolar electrode $BP_1$, and a separator 4 arranged between these positive electrode active material layer 2 and negative electrode active material layer 3. As above, one power generation unit may be constituted of two adjacent bipolar electrodes. Moreover, the power generation unit $U_3$ has the positive electrode active material layer 2 of the positive electrode-side end part electrode CA, the negative electrode active material layer 3 of the bipolar electrode $BP_2$, and a separator 4 arranged between these positive electrode active material layer 2 and negative electrode active material layer 3.

Figure 5:
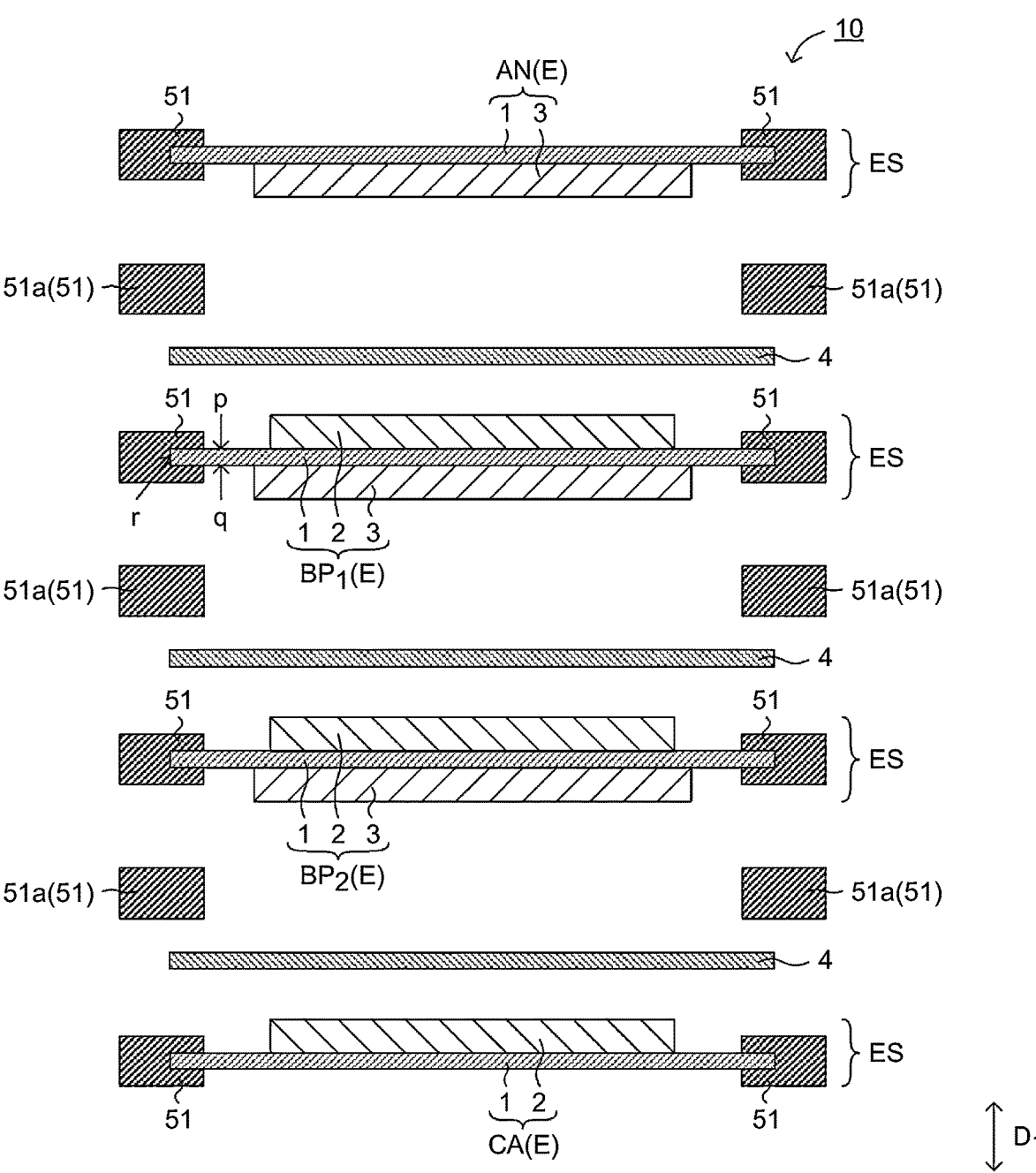
FIG. 5 is a schematic sectional view exemplarily showing a manufacturing method for the insert member in the present disclosure.

A method for producing the insert member 10 shown in FIG. 4A and FIG. 4B is not specially limited but a method shown in FIG. 5 may be employed, for example. As shown in FIG. 5, a method of stacking a plurality of electrode sheets ES in the thickness direction $D_1$ may be employed. In FIG. 5, as the electrode sheets ES, an electrode sheet ES having the bipolar electrode BP, an electrode sheet ES having the positive electrode-side end part electrode CA, and an electrode sheet ES having the negative electrode-side end part electrode AN are used. Moreover, each electrode sheet ES has an electrode E having the current collector body 1 and the active material layer (positive electrode active material layer 2, negative electrode active material layer 3), and a resin-made frame body 51 arranged along the outer edge of the current collector body 1. The frame body 51 covers a part of one principal surface p of the current collector body 1, a part of the other principal surface q of the current collector body 1, and the entirety of a lateral surface r constituting the outer edge of the current collector body 1.

In FIG. 5, the negative electrode active material layer 3 of the bipolar electrode $BP_1$ and the positive electrode active material layer 2 of the bipolar electrode $BP_2$ are caused to face each other via the separator 4. In this stage, another frame body 51 (spacer 51a) is arranged between the frame body 51 of the bipolar electrode $BP_1$ and the frame body 51 of the bipolar electrode $BP_2$. Likewise, the positive electrode active material layer 2 of the bipolar electrode $BP_1$ and the negative electrode active material layer 3 of the negative electrode-side end part electrode AN are caused to face each other via the separator 4. In this stage, another frame body 51 (spacer 51a) is arranged between the frame body 51 of the bipolar electrode $BP_1$ and the frame body 51 of the negative electrode-side end part electrode AN. Likewise, the negative electrode active material layer 3 of the bipolar electrode $BP_2$ and the positive electrode active material layer 2 of the positive electrode-side end part electrode CA are caused to face each other via the separator 4. In this stage, another frame body 51 (spacer 51a) is arranged between the frame body 51 of the bipolar electrode $BP_2$ and the frame body 51 of the positive electrode-side end part electrode CA. The plurality of electrode sheets ES is stacked in the thickness direction $D_1$ as above, the frame bodies 51 adjacent in the thickness direction $D_1$ are welded, and thereby, a seal part (for example, the seal part 5 in FIG. 1A, FIG. 1B, and FIG. 1C) is obtained.

Not being specially limited, other examples of the insert member include a resin member, a metal member, and a composite member of resin and metal. Examples of the resin member include a sheet, a plate material, or a solid shape article that is configured of at least one of resin and rubber. Examples of the metal member include a sheet, a plate material, or a solid shape article that is configured of metal. Examples of the composite member of resin and metal include a sheet, a plate material, or a solid shape article that is configured of metal and at least one of resin and rubber. Specific examples of the composite member of resin and metal include a printed circuit board and an integrated circuit.

(2) Filling Step

The filling step in the first embodiment is a step of inserting and fixing the first resin part of the insert member into the mold and filling a space between the first resin part and the mold with a molten second thermoplastic resin using an injection molding apparatus.

The matters described for the aforementioned first thermoplastic resin also apply to the second thermoplastic resin, the description thereof being omitted here. Moreover, the second thermoplastic resin may be compatible with the first thermoplastic resin constituting the first resin part. This is because excellent adhesion between the first resin part and the second resin part is obtained. Each of the second thermoplastic resin and the first thermoplastic resin may be polyolefin, and further, may be polyethylene.

As shown in FIG. 1A, the injection molding apparatus 30 has the nozzle 31, the cylinder 32 connected to the nozzle 31, the screw 33 that is movable in the inner space of the cylinder 32, and a hopper 34 that feeds a raw material to the cylinder 32. Moreover, the screw 33 has a body part 33c, a head part 33a, and a no-return ring 33b arranged between the body part 33c and the tip part 33a. The second thermoplastic resin R2 input to the hopper 34 drops onto the heated cylinder 32. The second thermoplastic resin R2 having dropped onto the cylinder 32 is fed to the nozzle 31 side while being compressed and kneaded by rotation of the screw 33, and the screw 33 retracts to the position of measurement completion. The temperature of the second thermoplastic resin R2 at the nozzle 31 is not specially limited. It may be not less than 190° C. and not more than 210° C. when the second thermoplastic resin R2 is polyethylene, for example.

As shown in FIG. 1B, the screw 33 is moved to the nozzle 31 side thereby to inject the second thermoplastic resin R2 from the nozzle 31 into the mold 20. The screw 33 moves from the position of measurement completion to the position of VP switching. The position of VP switching is adjusted to attain a filling amount, for example, not less than 0.85 and not more than 0.95 relative to a target filling amount of the second thermoplastic resin R2. Moreover, from the position of measurement completion to the position of VP switching, control is typically performed by a filling speed.

(3) Pressure Holding Step

The pressure holding step in the first embodiment is a step of applying the holding pressure to the second thermoplastic resin that the space is filled with. Moreover, the screw is moved to the nozzle side from the position of VP switching with the holding pressure, and the remaining filling with the second thermoplastic resin is performed. A decrease in volume of the second thermoplastic resin due to cooling is supplemented with the remaining filling with the second thermoplastic resin while the second thermoplastic resin is prevented from flowing back from the mold, by performing the pressure holding step.

In the first embodiment, the first holding pressure is applied until the inner temperature of the first resin part reaches the deflection temperature under load of the first thermoplastic resin, and the second holding pressure lower than the first holding pressure is applied after the inner temperature reaches the deflection temperature under load. Examples of the inner temperature of the first resin part include a temperature at the position P inner from the surface S of the first resin part 15 by not less than 1 mm and not more than 5 mm as shown in FIG. 1B. As above, controlling the holding pressure can restrain the softening first resin part 15 from deforming due to the holding pressure. As a result, the insert member 10 can be restrained from deforming.

The inner temperature of the first resin part 15 may be beforehand estimated by computer aided engineering (CAE). Specifically, time $T_1$ until reaching the deflection temperature under load of the first thermoplastic resin from the start of the pressure holding step may be beforehand estimated. The first holding pressure is applied until time $T_1$ elapses from the start of pressure holding, and the second holding pressure lower than the first holding pressure is applied after time $T_1$ elapses. Moreover, the inner temperature of the first resin part 15 may be measured by arranging a thermometer inside the first resin part 15, the first holding pressure being applied until the inner temperature of the first resin part 15 reaches the deflection temperature under load of the first thermoplastic resin, the second holding pressure being applied after the inner temperature of the first resin part 15 reaches the deflection temperature under load of the first thermoplastic resin.

The difference between the first holding pressure and the second holding pressure is not specially limited but may be, for example, not less than 0.1 MPa, may be not less than 0.5 MPa, and may be not less than 1.0 MPa. Moreover, for example, when each of the first thermoplastic resin and the second thermoplastic resin is polyolefin, the first holding pressure may be not less than 1.5 MPa, the second holding pressure being less than 1.5 MPa.

(4) Molded Article

The molded article is obtained by the aforementioned steps. Applications of the molded article are not specially limited but may be those to power storage modules as a member used therefor. When the molded article is a member used for a power storage module, supplying an electrolyte solution to the inside of the obtained molded article and sealing it afford the power storage module. Specific examples of the power storage module include a secondary battery (for example, a lithium ion secondary battery) and an electric double layer capacitor. Moreover, examples of applications of power storage devices include power supplies for vehicles such as a hybrid electric vehicle (HEV), a plug-in hybrid electric vehicle (PHEV), a battery electric vehicle (BEV), a gasoline vehicle, and a diesel vehicle. In particular, they may be used for drive power supplies for a hybrid electric vehicle (HEV), a plug-in hybrid electric vehicle (PHEV), and a battery electric vehicle (BEV). Moreover, the power storage module may be used for power supplies for movable bodies (for example, a train, a ship, and an airplane) other than vehicles and may be used for power supplies for electric appliances such as an information processing apparatus.

2. Second Embodiment

FIG. 1A, FIG. 1B, and FIG. 1C are schematic sectional views exemplarily showing a preparing step, a filling step, and a pressure holding step in the present disclosure. First, as shown in FIG. 1A, an insert member 10 having, on its surface, a first resin part 15 containing a first thermoplastic resin is prepared (preparing step). Next, the first resin part 15 of the insert member 10 is inserted and fixed into a mold 20. Next, a nozzle 31 of an injection molding apparatus 30 is arranged at the sprue 21 of the mold 20. After that, as shown in FIG. 1B, by moving a screw 33 of the injection molding apparatus 30 to the nozzle 31 side, with a second thermoplastic resin R2 that a cylinder 32 is filled with, a space between the first resin part 15 and the mold 20 is filled (filling step). Next, a holding pressure is applied to the second thermoplastic resin R2 that the space is filled with (pressure holding step).

Figure 6A:
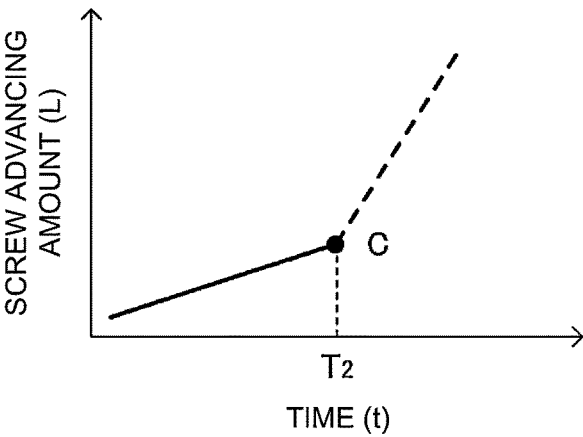
FIG. 6A is a graph for explaining change in advancing amount (L) of a screw.
Figure 6B:
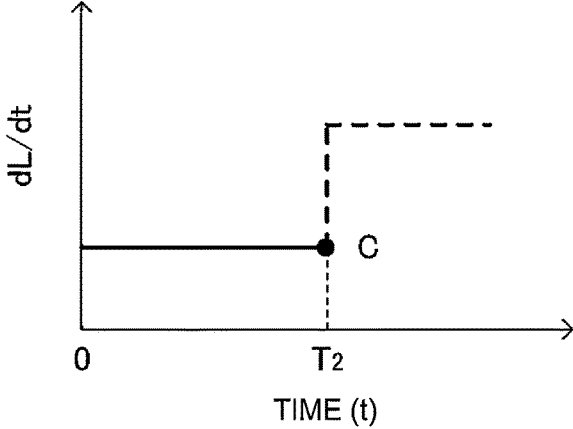
FIG. 6B is a graph for explaining change in advancing amount (L) of the screw.
Figure 6C:
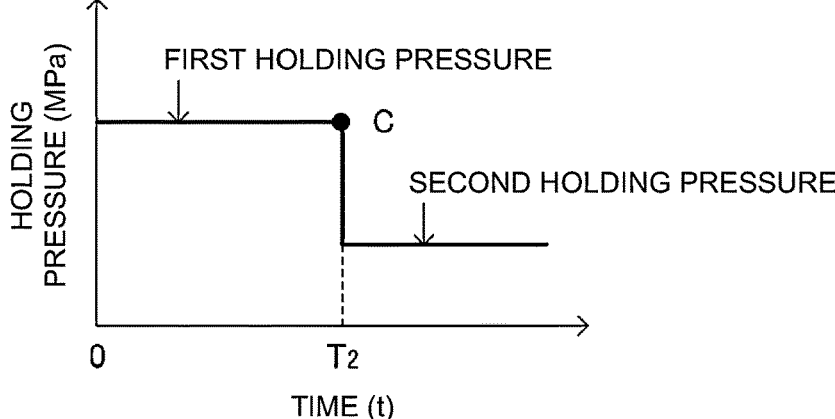
FIG. 6C is a graph for explaining change in advancing amount (L) of the screw.

In the second embodiment, as shown in FIG. 6A, an advancing amount of the screw in the pressure holding step is focused on. As shown in FIG. 3, when heat of the injected second thermoplastic resin R2 is conducted to the first resin part 15 and the first resin part 15 softens, the advancing amount of the screw increases. Specifically, as shown in FIG. 6A, an inclination of the advancing amount of the screw increases from a changing point C as a border. As shown in FIG. 6B, an advancing amount (dL/dt) of the screw per unit time screw sharply increases from the changing point C as the border. As shown in FIG. 6C, in the pressure holding step, a first holding pressure is applied until the advancing amount (dL/dt) of the screw per unit time reaches the changing point C (until time $T_2$ elapses from the start of pressure holding), and a second holding pressure lower than the first holding pressure is applied after the dL/dt reaches the changing point C (after time $T_2$ elapses from the start of pressure holding).

According to the second embodiment, the first holding pressure is applied until the advancing amount (dL/dt) of the screw per unit time reaches the changing point, after that, the second holding pressure lower than the first holding pressure is applied, and thereby, a molded article in which the insert member is restrained from deforming can be obtained.

(1) Preparing Step and Filling Step

The preparing step and the filling step in the second embodiment are similar to the contents of those described above for the first embodiment, their description being omitted here.

(2) Pressure Holding Step

The pressure holding step in the second embodiment is a step of applying the holding pressure to the second thermoplastic resin that the space is filled with. Furthermore, the screw is moved to the nozzle side from the position of VP switching with the holding pressure, and the remaining filling with the second thermoplastic resin is performed. A decrease in volume of the second thermoplastic resin due to cooling is supplemented with the remaining filling with the second thermoplastic resin while the second thermoplastic resin is prevented from flowing back from the mold, by performing the pressure holding step.

In the second embodiment, the first holding pressure is applied until the advancing amount (dL/dt) of the screw of the injection molding apparatus per unit time reaches the changing point, and the second holding pressure lower than the first holding pressure is applied after the dL/dt reaches the changing point. The advancing amount of the screw can be measured, for example, by a displacement sensor. As above, by controlling the holding pressure, the softening first resin part 15 can be restrained from deforming due to the holding pressure. As a result, the insert member 10 can be prevented from deforming.

Since the advancing amount (dL/dt) sharply rises at the changing point C, switching from the first holding pressure to the second holding pressure may be made when the increase in advancing amount (dL/dt) exceeds a threshold. Moreover, the difference between the first holding pressure and the second holding pressure is similar to the content of that described above for the first embodiment, its description being omitted here.

(3) Molded Article

The molded article obtained by the aforementioned steps is similar to the content of that described above for the first embodiment, its description being omitted here.

The present disclosure is not limited to the aforementioned embodiments. The aforementioned embodiments are merely exemplary, and any implementation having substantially an equivalent configuration to the technical concept disclosed in the claims in the present disclosure and affording the similar operation and effects is included in the technical scope in the present disclosure.

What is claimed is:

1. A manufacturing method for a molded article, comprising:
    a preparing step of preparing an insert member having, on a surface, a first resin part containing a first thermoplastic resin;
    a filling step of inserting and fixing the first resin part of the insert member into a mold and filling a space between the first resin part and the mold with a molten second thermoplastic resin using an injection molding apparatus; and
    a pressure holding step of applying a holding pressure to the second thermoplastic resin that the space is filled with, wherein
    in the pressure holding step, a first holding pressure is applied until an inner temperature of the first resin part reaches a deflection temperature under load of the first thermoplastic resin, and a second holding pressure lower than the first holding pressure is applied after the inner temperature reaches the deflection temperature under load.

2. The manufacturing method for a molded article according to claim 1, wherein:
    each of the first thermoplastic resin and the second thermoplastic resin is polyolefin;
    the first holding pressure is not less than 1.5 MPa; and
    the second holding pressure is less than 1.5 MPa.

3. The manufacturing method for a molded article according to claim 1, wherein:
    the molded article is a member used for a power storage module;
    the insert member has
        an electrode body having a plurality of electrodes stacked in a thickness direction, and
        a resin-made seal part arranged along an outer edge of the electrode body;
    each electrode has
        a current collector body, and
        an active material layer; and
    the seal part is the first resin part.

4. The manufacturing method for a molded article according to claim 3, wherein the electrode body has a bipolar electrode as the electrode.

* * * * *